United States Patent
Hahn et al.

(10) Patent No.: US 7,832,534 B2
(45) Date of Patent: Nov. 16, 2010

(54) DEVICE FOR TRANSMITTING ELECTRICAL ENERGY FROM THE TRACK TO THE VEHICLE OF A MAGNETIC LEVITATION RAILWAY

(75) Inventors: Wolfgang Hahn, Kassel (DE); Peter Becker, Olching (DE); Luitpold Miller, Ottobrunn (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 183 days.

(21) Appl. No.: 10/592,827

(22) PCT Filed: Mar. 9, 2005

(86) PCT No.: PCT/DE2005/000407

§ 371 (c)(1),
(2), (4) Date: Sep. 14, 2006

(87) PCT Pub. No.: WO2005/090112

PCT Pub. Date: Sep. 29, 2005

(65) Prior Publication Data

US 2008/0236973 A1    Oct. 2, 2008

(30) Foreign Application Priority Data

Mar. 15, 2004 (DE) .......................... 10 2004 012 744
Nov. 19, 2004 (DE) .......................... 10 2004 056 439

(51) Int. Cl.
*B61L 9/00* (2006.01)
*B61L 3/00* (2006.01)

(52) U.S. Cl. .......................... 191/10; 246/194

(58) Field of Classification Search ............... 191/2, 191/3, 10, 22 R; 246/192 R, 193, 194
See application file for complete search history.

(56) References Cited

U.S. PATENT DOCUMENTS

| 4,181,080 A | * | 1/1980 | Miller .......................... 104/281 |
| 4,636,667 A | | 1/1987 | Holzinger et al. |
| 4,698,895 A | | 10/1987 | Miller et al. |
| 5,467,718 A | | 11/1995 | Shibata et al. |
| 5,666,883 A | * | 9/1997 | Kuznetsov .................. 104/281 |
| 5,904,101 A | | 5/1999 | Kuznetsov |
| 6,089,512 A | * | 7/2000 | Ansorge et al. ............. 246/194 |

FOREIGN PATENT DOCUMENTS

| DE | 32 37 373 | 5/1983 |
| DE | 34 10 119 | 10/1985 |
| DE | 39 28 277 | 12/1990 |
| DE | 195 12 107 | 10/1996 |
| DE | 102 32 720 | 2/2004 |
| EP | 0 580 107 | 1/1994 |
| WO | 97/30504 | 8/1997 |

\* cited by examiner

*Primary Examiner*—S. Joseph Morano
*Assistant Examiner*—Robert J McCarry, Jr.
(74) *Attorney, Agent, or Firm*—Michael J. Striker (57) ABSTRACT

A device for transmitting electrical energy from the track (2, 3) to the vehicle (1) of a magnetic leviation railway is described. According to the invention a contactless operating device is provided in that the track (2, 3) has mounted thereon at least one primary line (44) connected to a voltage source (46) and being designed as an emitting coil and in that the vehicle (1) has mounted thereon at least one pick-up coil (47) applied to its magnet back box (15).

13 Claims, 13 Drawing Sheets

DEVICE FOR TRANSMITTING ELECTRICAL ENERGY FROM THE TRACK TO THE VEHICLE OF A MAGNETIC LEVITATION RAILWAY

The invention relates to a device of the species mentioned in the preamble of claim 1.

The on-board energy of usual magnetic levitation vehicles is usually generated in a contact-less manner by the aid of linear generators which are integrated into the magnet poles of at least one magnet arrangement destined for carrying and/or guiding the magnetic levitation vehicle and which, for example, co-act with a long stator (e.g. DE 34 10 119 A1). The transmission of energy depends on the speed of the magnetic levitation vehicle which is the reason why prior art devices cover the full energy demand of the magnetic levitation vehicle only from speeds of approximately 100 km/h on. Therefore, additional energy sources are required where the speed of magnetic levitation vehicles is less or zero (e.g. in railway stations). This includes powerful batteries carried along in the magnetic levitation vehicle on the one hand and external means on the other hand, e.g. contact rails laid along slow speed sections of the track, to which contact rails current collectors mounted on the magnetic levitation vehicle are assigned to. The latter might make it necessary to stop the magnetic levitation vehicle in case of operating failures only where such an external power supply is available. Moreover, the financial expenditure on such devices is comparably substantial. Finally, they require constant maintenance due to discharging procedures in the batteries or due to mechanical wear and tear.

Now, therefore, the technical problem to be solved by the present invention is to configure the device of the above mentioned species in such a manner that it ensures an efficient and permanent energy transmission by applying simple and low-cost constructive means.

The characterizing features of claim 1 serve for solving this problem.

The device according to the invention bears the advantage that it is low in wear and tear and that it also requires little maintenance while working in winter-time. Moreover, the primary conductor can be manufactured at low cost and can be mounted with a tolerable cost expenditure along the entire track, thus making it possible to stop the magnetic levitation vehicle or to operate the vehicle at reduced speed in case of failures at any point of the track. The fastening of the receiving coil on a magnet back box moreover bears the advantage that it can be combined with the magnet arrangement to an integral modular unit and that its relative position to the primary conductor is subject to less fluctuations as if it were mounted, for example, at the car body supported by springs on the magnet back box.

Other advantageous features of the present invention become evident from the sub-claims.

The invention is explained in greater detail hereinbelow by means of a preferred embodiment and based on the drawings enclosed hereto which have been prepared in different scales, wherein.

Figure 1:
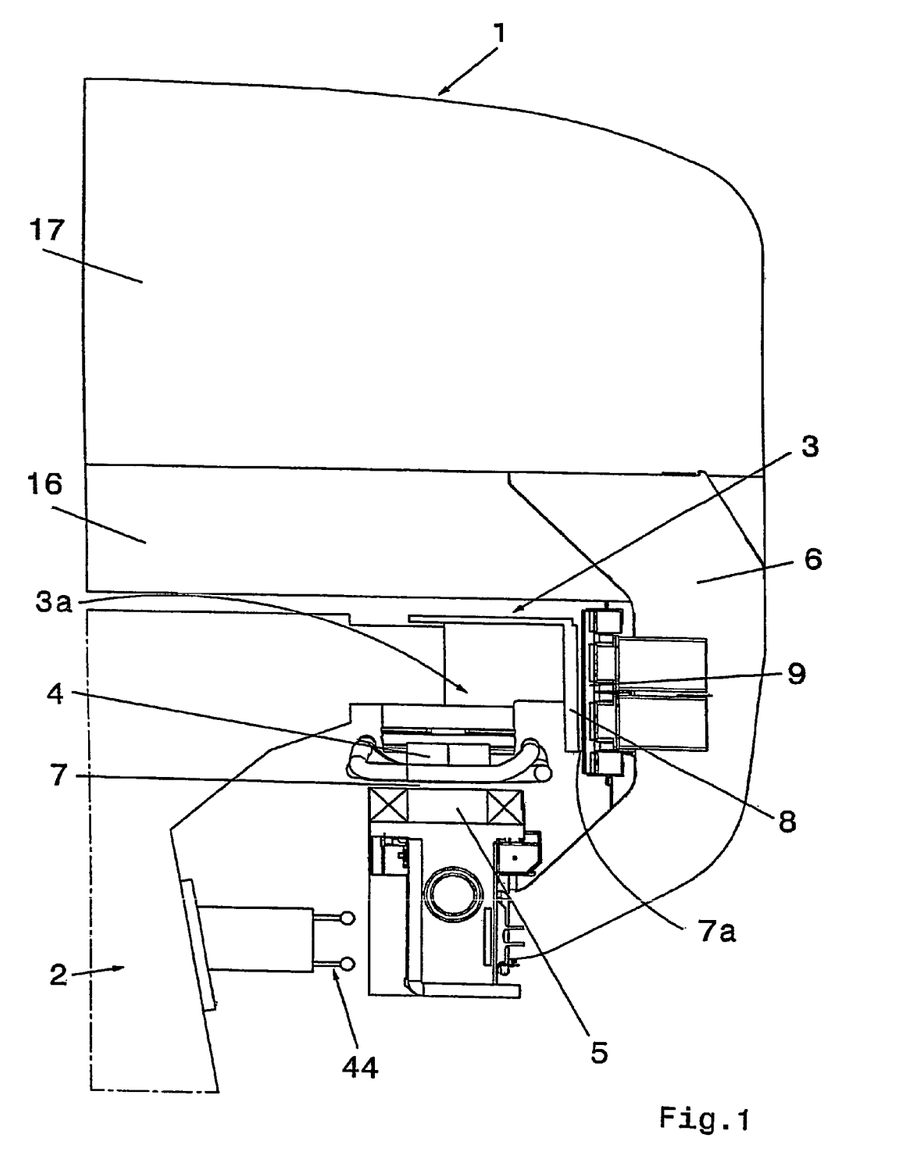
FIG. 1 schematically shows a partial section through a usual magnetic levitation vehicle in the area of a track provided with a long stator.

FIG. 1 schematically shows a cross-section through a magnetic levitation vehicle 1 which is conventionally movably mounted on a guideway extending in longitudinal direction of a route, said guideway being comprised of beams (supports) 2 made of steel and/or concrete as well as guideway plates 3 mounted on it. The propulsion of the magnetic levitation vehicle 1 is effected by a long stator motor which is comprised of stator packets 4 affixed underneath the guideway plates 3 and arranged one behind the other in their longitudinal direction. The stator packets 4 are comprised of alternatively succeeding teeth and grooves not shown here, with windings being inserted therein that are fed with three-phase current of a variable amplitude and frequency. The actual excitation field of the long stator motor is generated by at least one first magnet arrangement acting as support magnet 5 which is affixed by at least one lateral support bracket 6 to said magnetic levitation vehicle 1 and which is comprised of magnet poles facing the downwardly open grooves of the stator packets 4 as shown in FIG. 1. The support magnet 5 not only provides the excitation field, but also fulfils the function of carrying and levitation by maintaining a defined air gap 7 of e.g. 10 mm between said support magnet 5 and said stator packets 4 during operation of the magnetic levitation vehicle 1.

For the guidance of the magnetic levitation vehicle 1 the guideway plates 3 comprise laterally affixed guidance rails 8, which are faced by guidance magnets 9 also mounted to the support brackets 6 and serving for maintaining a gap 7a corresponding to gap 7 between itself and the guidance rail 8 during operation of the vehicle.

Figure 2:
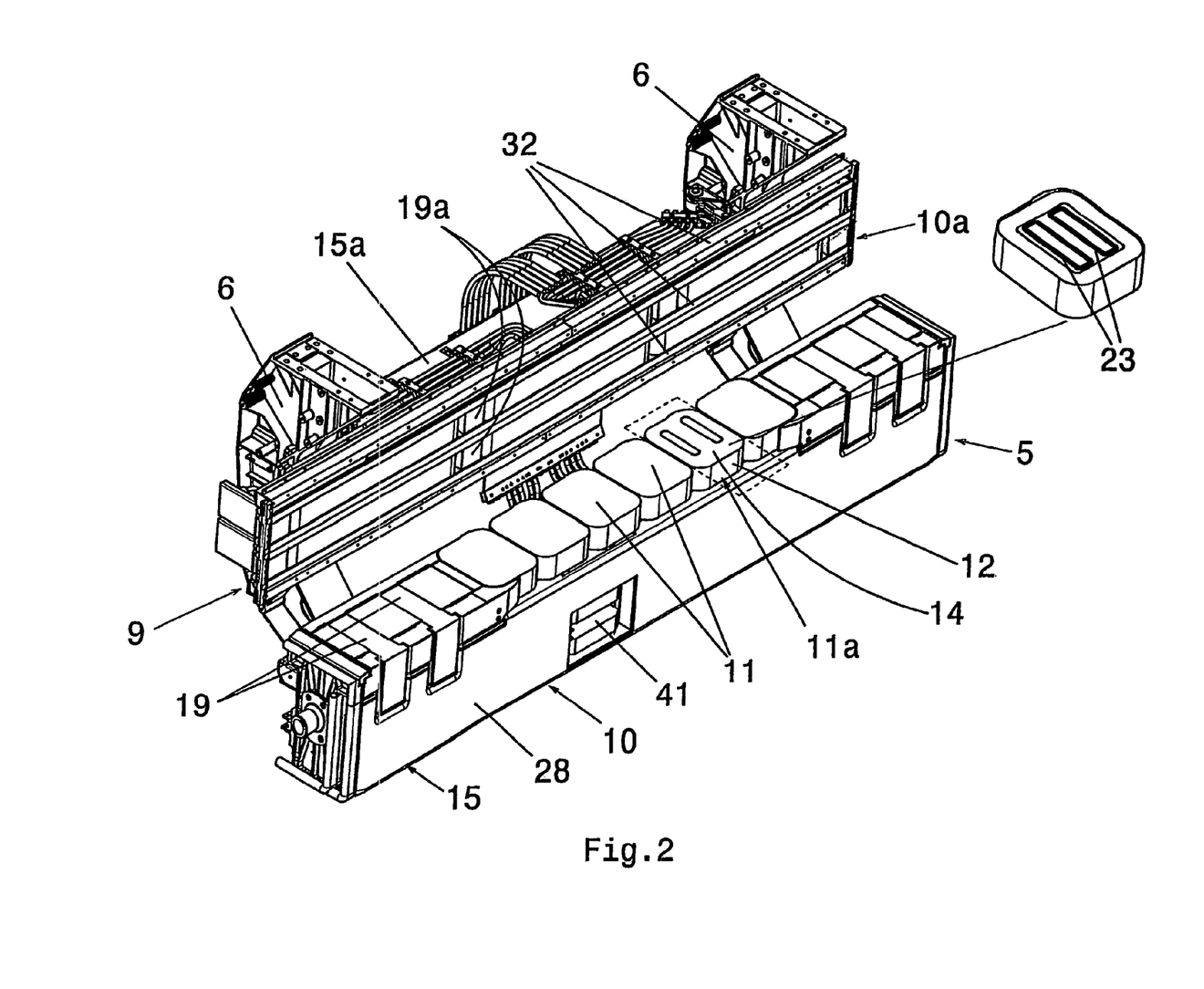
FIGS. 2 and 3 show a perspective view of a module with two magnet arrangements of a magnetic levitation vehicle pursuant to FIG. 1, viewed from the track side and from the outside, respectively.
Figure 3:
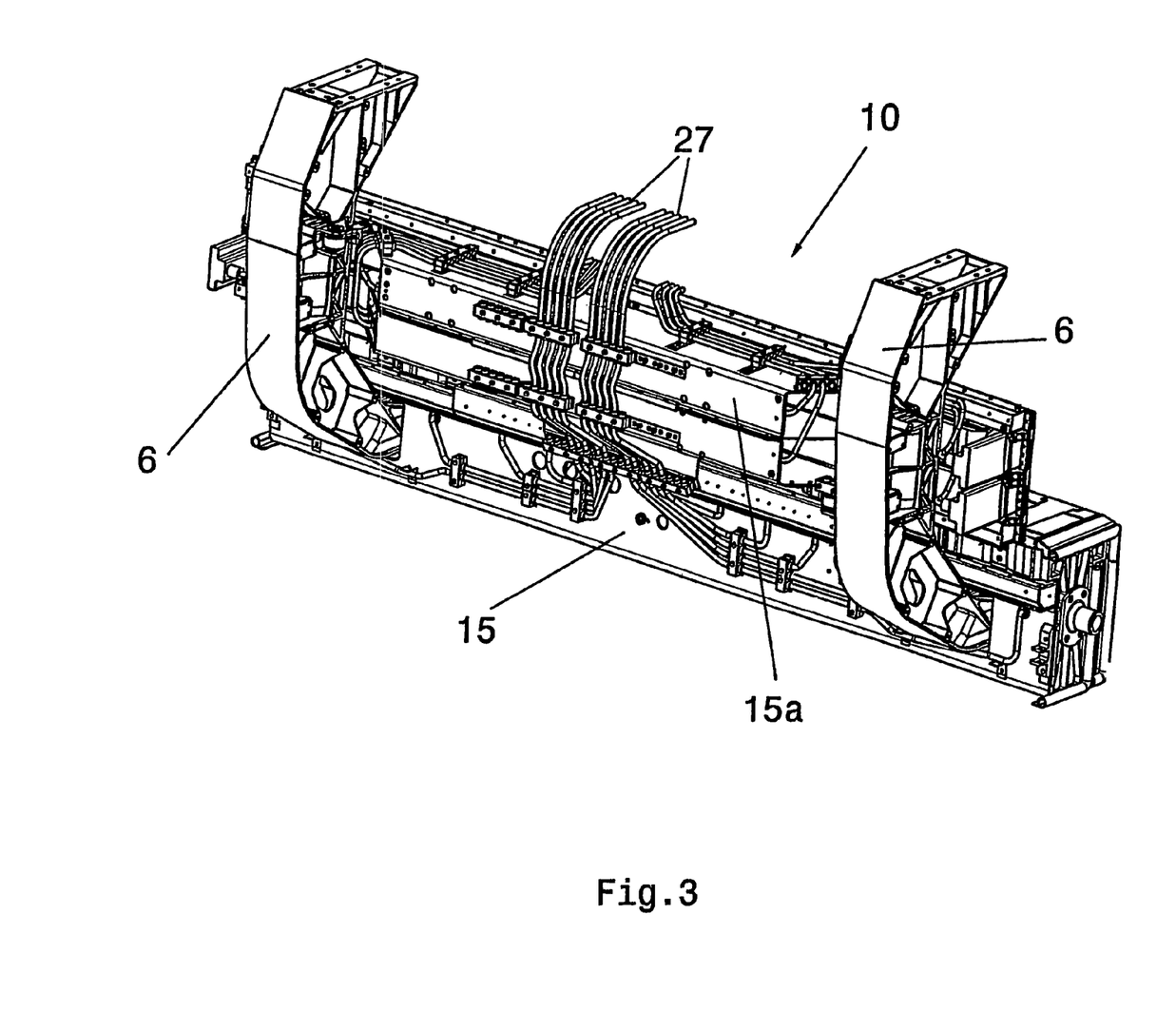

As shown on FIGS. 2 and 3, the support magnet 5 and the guidance magnet 9 shown in FIG. 1 form a module being affixed to the support brackets 6 and comprising a magnet arrangement 10, 10a for the functions of "supporting" (carrying) and "guiding". However, it is obvious that a plurality of such modules can be mounted at the magnetic levitation vehicle 1 in lateral arrangement side by side and one behind the other, viewed in the direction of travel.

The magnet arrangement 10 for the "carrying" function is comprised of twelve magnet poles 11 arranged one behind the other, whose windings 12 and cores 14, being schematically indicated in FIG. 2 for one of said magnet poles 11a, are electrically connected in series and are usually surrounded by a corrosion protection in form of a cast resin layer or the like. Said cores 14 of the individual magnet poles 11 are connected to each other by pole backs not shown and affixed by pole plates and rods penetrating through these pole plates, also not shown, to a means hereinafter called magnet back box 15 of the magnet arrangement 10. Engaging to this magnet back box 15 via primary springs are the support brackets 6 which are connected with a bend-proof understructure or suspension frame 16 (FIG. 1) being comprised of longitudinal and transverse connectors and supporting a car body 17 of said magnetic levitation vehicle 1 equipped with a passenger cell.

Magnetic levitation vehicles 1 and their magnet arrangements are generally known to an expert, e.g. through printed publications U.S. Pat. No. 4,698,895, DE 39 28 277 A1, and PCT WO 97/30504 A1, which for sake of simplicity are made a part of the present disclosure by reference.

Figure 4:
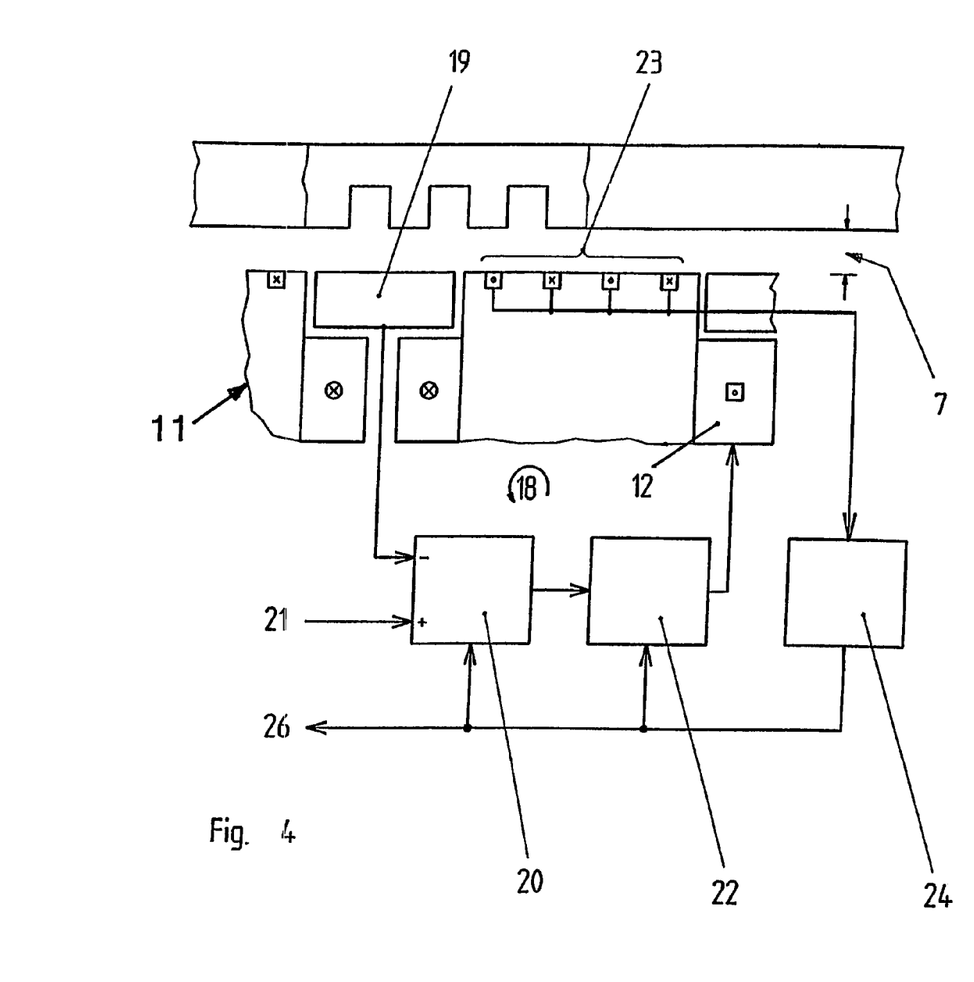
FIG. 4 schematically shows a control loop for the magnet arrangements according to FIG. 2 and FIG. 3.

One control circuit 18 according to FIG. 4 serves for controlling the windings 12 of the magnet poles 11 to maintain the gap 7 constant during the ride of the magnetic levitation vehicle 1. This control circuit comprises at least one gap sensor, or preferably several gap sensors 19 (see also FIG. 2,) which border the same plane as the magnet poles 11, which measure the actual size of the gap 7 by inductive or capacitive means and which serve as actual value transmitters for the control circuit 18. The electrical signals transmitted by gap sensors 19 are passed to a controller 20 and compared there with a nominal value fed by a line 21 and being fixedly preselected or adapted. Thereof, the controller 20 determines a differential or actuator signal for an actuator 22 which in turn controls the current through the windings 12 in such a manner that the gap 7 substantially takes a constant size and maintains it during the ride.

The required operating voltage for the control circuit 18 is supplied by a power supply unit shown in FIG. 4 and including windings 23 of a linear generator, said windings being mounted in at least one magnet pole, shown as an example in FIG. 2 in an enlarged detail of magnet pole 11a, and supplying in co-action with the long stator an alternate voltage of e.g. up to 300 V, depending on the speed of the magnetic levitation vehicle 1. This voltage is transformed in a voltage converter 24, having e.g. a step-up chopper, to a direct voltage of e.g. 440 V envisaged for operation, said voltage being fed to the controller 20 and the actuator 22 on the one hand and passed on through a line 26 to the on-board net of the magnetic levitation vehicle on the other hand.

While the controller 20, actuator 22 and the voltage transformer 24 have hitherto been placed anywhere, preferably in the floor of car body 17, thus calling for extensive cable routing as indicated by reference number 27 in FIG. 3, the present invention proposes to house these components entirely in the magnet back box 15 of the magnet arrangement 10. This results especially from FIG. 5, which shows a view of the magnet back box 15 upon removal of a covering 28 pointing to the track 2 (FIG. 2). Reference numerals 29 by example show openings in the magnet back box 15 which serve for accommodating drawer-like units 30 not illustrated in greater detail but indicated in FIG. 6 and FIG. 7 and housing the control circuit 18 and its components 20 and 22 as well as the voltage converters 24 of the power supply unit. Expediently the drawer-like units 30 are so configured that the correct contacts can be established when assembled without this requiring any further additional work, i.e. the openings 29 and the drawer-like units 30 are provided with co-acting plug-in and draw-out means or the like.

Accommodation of the control circuit 18 and the voltage converter 24 in the magnet back box 15 is possible without any problem, because the magnet back box 15 in known magnet arrangements 10 substantially consists of a hollow body with a U-profile, thus offering sufficient space. Thereby one can largely dispense with the cabling 27, because actually only the line 26 leading to the on-board net as well as any required lines for control and diagnostic purposes must be laid outside from the magnet back box 15. All the other lines can be laid within the magnet back box 15 and be laid from there on the shortest distance to the gap sensors 19 as well to as the windings 12 and 23. It follows therefrom that the entire magnet arrangement 10 including the magnet poles 11, the control circuit 18, the power supply unit 23, 24, and the cabling form an autonomous mechatronic module in which all the functions needed for the ability of levitation are integrated. If required, additional buffer batteries can be accommodated in the magnet back box 15 which in case of a standstill or a too slow ride of the magnetic levitation vehicle 1 supply the required energy.

Apart from the magnet arrangement 10 for the function of "carrying", the module shown in FIG. 2 has another magnet arrangement 10a with the magnet poles 32 for the function of "guiding". The magnet arrangement 10a is provided near a magnet back box 15a (FIG. 3) and expediently accommodated within the same raster length of e.g. 3096 mm which is also applicable to the magnet arrangement 10. By analogy to the gap sensors 19, other gap sensors 19a are assigned to the magnet poles 32 and connected to other control circuits not shown configured like the control circuits 18 and serving the purpose of keeping the gap 7a between magnet poles 32 and the lateral guidance rail 8 (FIG. 1) at a constant value. The same applies to the other control circuits, as has been described by way of the control circuits 18 hereinabove. The power to these control circuits is expediently supplied by the aid of the power supply units 23 and 24, because the guidance magnets normally have no windings of linear generators. In contrast with the magnet arrangement 10, there are only three magnet poles 32 existing in the magnet arrangement 10a which are formed by two rows of three windings each.

The magnet arrangement 10 destined for the function of "carrying" is comprised of twelve magnet poles 11 which are combined to form two groups of six magnet poles each lying immediately side by side. Each of these groups is controlled by one control circuit 18 each and expediently supplied with electric current by a power supply unit 23, 24 individually assigned to one group each. The advantage thus achieved on the one hand is that in case of a failure of one group, the other group keeps on working. On the other hand, in case of a failure of one group, the pertinent suspension frame 16 with its bend-proof longitudinal and transverse connectors is kept in its position by means of an assigned group of an adjacent magnet arrangement, without causing the magnetic levitation vehicle 1 to land on a gliding rail or without causing the magnet arrangement 10 to hit against the long stator. However, it also entails the two disadvantages outlined below.

A first disadvantage of a group-wise combination of six magnet poles 11 each is that comparably high voltages may occur in their windings 12. These are primarily caused by capacitive voltage excesses which result from the production of the windings of the magnet poles 11 from line bands and the parasitic capacities thus generated. The electrical oscillation circuits formed by the inductivities of the windings and the parasitic capacities lead to resonance oscillations which when the magnet arrangement 10 is excited, might entail so high voltages and electric currents that damage to isolation will occur. Another disadvantage is that the control circuits 18 have to be provided with special safety means which in case of a faulty working of an actuator 22 (FIG. 4) prevent the assigned group of magnet poles 11 from hitting against the long stator 11.

Figures 6, 7:
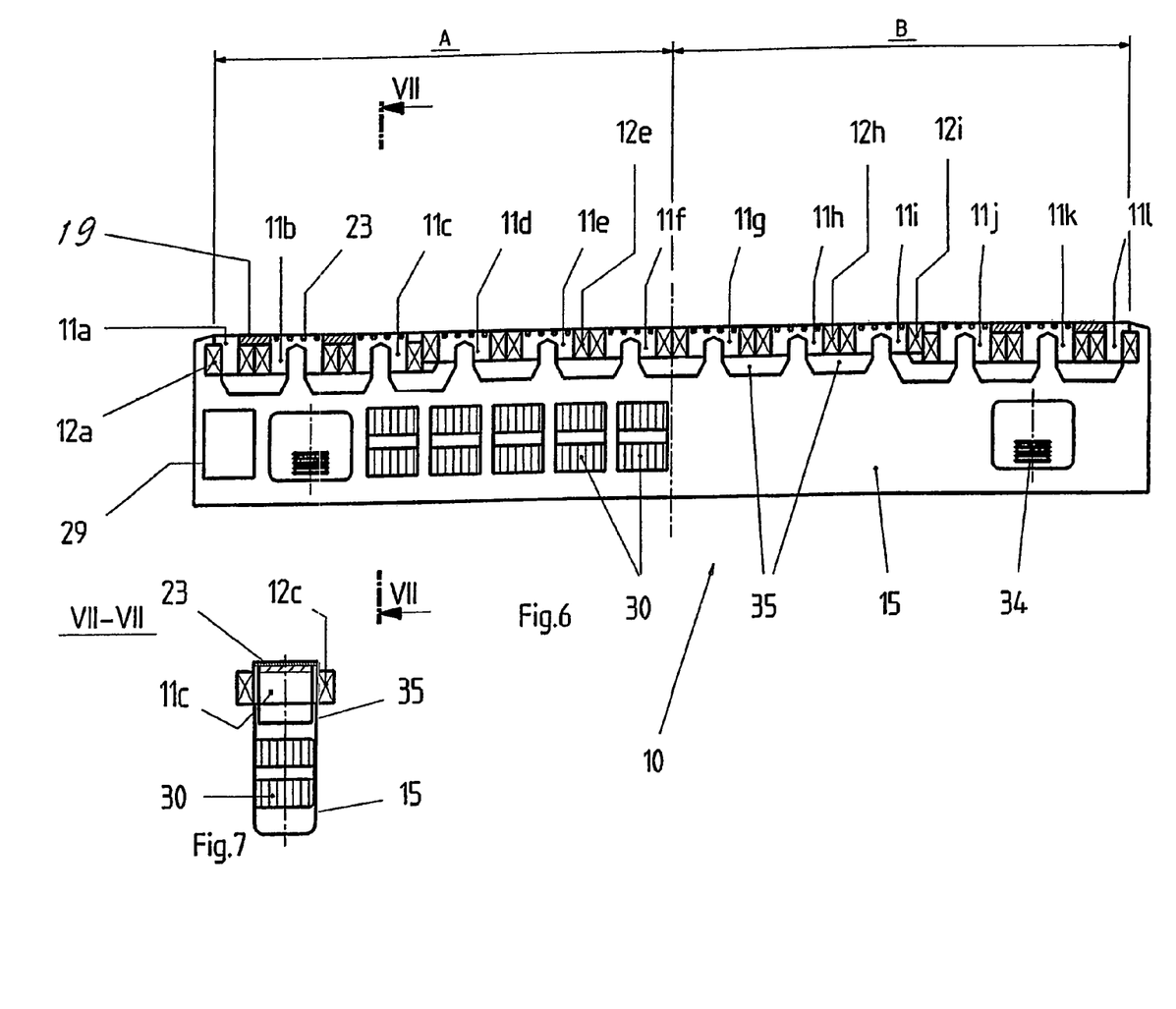
FIG. 6 shows a schematic front view of one of the magnet arrangements of FIG. 5 with further details.
FIG. 7 shows a section along line VII-VII of FIG. 6.
Figure 8:
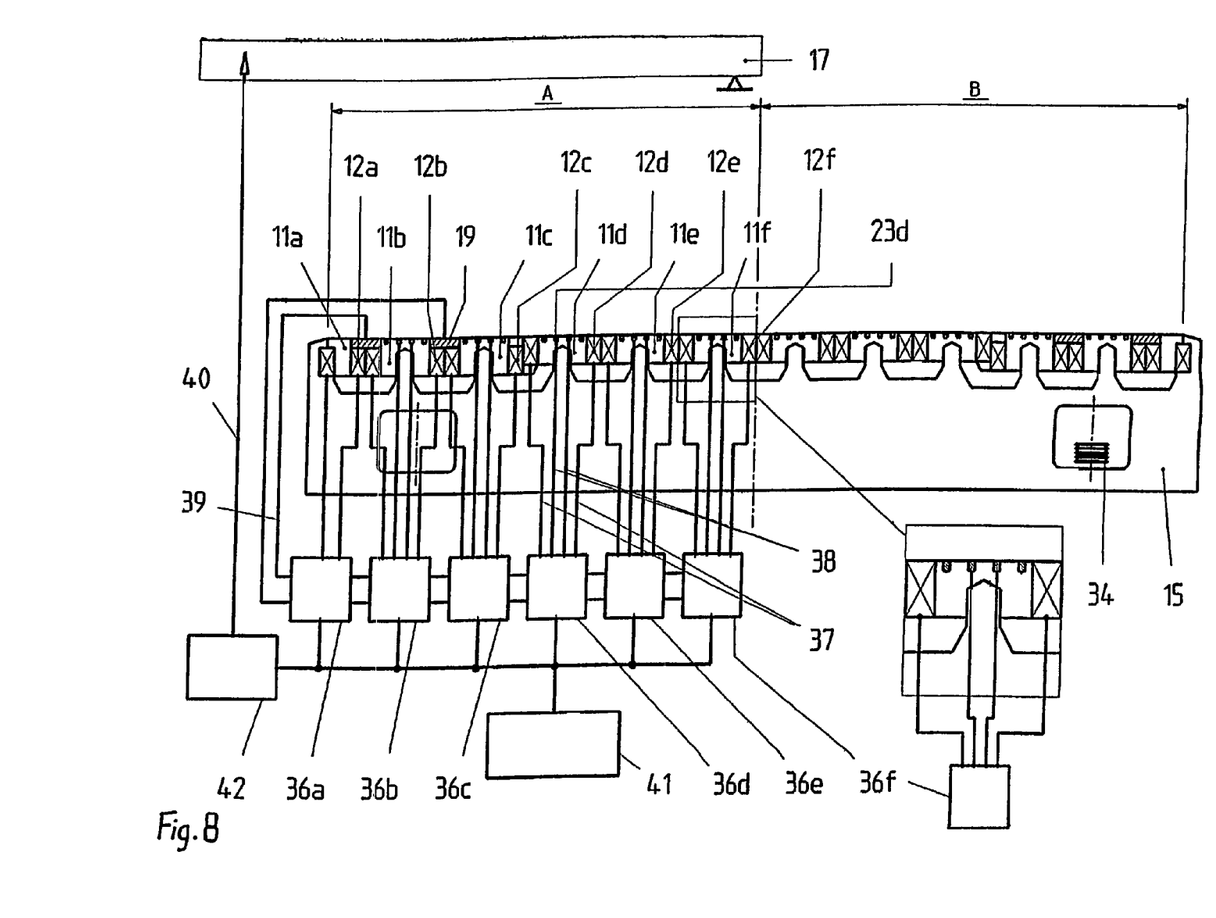
FIG. 8 shows a schematic circuit diagram for the magnet arrangement of FIG. 6 with the inventive individual activation of its magnet poles.

To avoid these disadvantages this invention proposes to provide each group only with one magnet pole 11 or maximally two magnet poles 11. Such an allocation of magnet poles 11 is shown on FIG. 6 to FIG. 8. The magnet arrangement 10 here contains twelve magnet poles 11a to 11I with windings 12a etc., only partly represented gap sensors 19 as well as windings 23 of the linear generator. Moreover, the magnet back box 15 and the drawer-like units 30, which contain the control circuits 18 and the power supply units, are indicated as in FIG. 2. The components contained in the drawer-like units 30 are shown in FIG. 8, however underneath the magnet back box 15 for the sake of a better understanding. Reference numerals 34 indicate recesses into which the ends of the support brackets 6 according to FIG. 1 and FIG. 2 enter. Furthermore, FIG. 6 shows the pole backs 35 not visible on FIG. 2, which connect the cores 14 of magnet poles 11 with each other. Finally, FIGS. 6 and 8 show that six magnet poles 11a to 11f or 11g to 11I each form one half-magnet A and B which are mechanically coupled in a known manner to the suspension frame 16 for the car body 17 (FIG. 1) of the magnetic levitation vehicle 1.

As shown in FIG. 8, the magnet poles 11 are electrically controlled individually and independently of each other. For this purpose, one of the magnet pole units 36a to 36f is assigned to each magnet pole 11a to 11f in the half-magnet A, each magnet pole unit containing an assigned control circuit 18 and an assigned voltage converter 24 provided with a step-up chopper or the like of the type as described above. Furthermore, each magnet pole winding 12 (e.g. especially a winding 12d of magnet pole 11d) is connected through lines 37 with an associated magnet unit (e.g. especially the magnet pole unit 36d) and the control circuit 18 contained therein and each linear generator winding 23 (e.g. especially a winding 23d of magnet pole 11d) is connected through lines 38 with the associated magnet pole unit 36d and the voltage converter 24 of FIG. 4 contained therein. The same applies in a same sense to all the other magnet poles 11, as is particularly shown by the enlarged representation of magnet pole 11f in FIG. 8. Moreover, the existing gap sensors 19 are connected via lines 39 with all magnet pole units 36 in order to transmit the relevant actual values of gap 7 to the control circuits 18 thereof. The other half-magnet B is configured accordingly.

On account of the described arrangement, each half-magnet A, B contains six magnet poles 11 with one assigned magnet pole unit 36 each. Therefore, if a magnet pole 11 or the pertinent magnet pole unit 36 becomes defective, there is no danger of an entire failure of the magnet pole arrangement 10 or of a half-magnet A, B, because the adjacent magnet poles of the defective unit can readily take-over their function. Therefore it is not required to provide the control circuits 18 with special security facilities against faulty controls of actuators 22, and there will be no occurrence of detrimental capacitive voltage excesses. Corresponding advantages will be obtained, if the magnet poles 11 are not activated individually, but in pairs. It is of special advantage that in case of a failure of any component, only one or maximally two magnet poles 11 will fail to work rather than six or twelve magnet poles 11 of a half-magnet or the entire magnet arrangement 10. Moreover, the voltage level is decreased, thus making it possible to reduce the voltage envisaged for the board net.

Besides, FIG. 8 also shows a special feature with regard to the magnet poles 11a and 11I, which form the beginning or the end of the magnet arrangement 10. As these magnet poles 11a, 11I are configured as half poles, thus leaving no space for the attachment of a linear generator winding 23, the pertinent magnet pole units 36a and 36I are expediently supplied with electrical current from the on-board net, as indicatively shown on FIG. 8 by a line 40.

The procedure to follow for the control of the magnet poles 32 of the guidance magnet is similar.

Generating on-board energy by the aid of linear generators works only in those track sections where the speed of the magnetic levitation vehicle 1 achieves a certain minimum rate. In other track sections, the electrical energy is therefore generated by the aid of electric contact rails mounted at the track and to which mechanical or mechanical-pneumatic current collectors 41 (FIG. 8) are assigned to. The current collectors 41 constitute integral parts of the power supply unit in addition to the windings 23 and are connected according to FIG. 8 to each individual magnet pole unit 36 if a single pole control is made. Moreover, the output of the current collector 41 leads through a suitable voltage converter 42, e.g. one that contains a step-up chopper, to the line 40. As shown on FIG. 2 and FIG. 5, the current collector 41 is integrated for example in the magnet back box 15 aerodynamically covered by the covering 28 and thus integrated into the autonomous module of the magnet pole arrangement 10 like the windings 23 of the linear generator.

Since contact rails and mechanical current collectors 41 are not always desired because of their propensity to wear and tear, particularly at high speeds, another essential feature of the invention provides for effecting the transmission of energy from the track 3 to the magnetic levitation vehicle 1 in a different manner, i.e. contact-less and preferably inductively. This is particularly shown in FIG. 9 which represents a schematic section substantially corresponding to FIG. 1, but at an enlarged scale.

Figure 9:
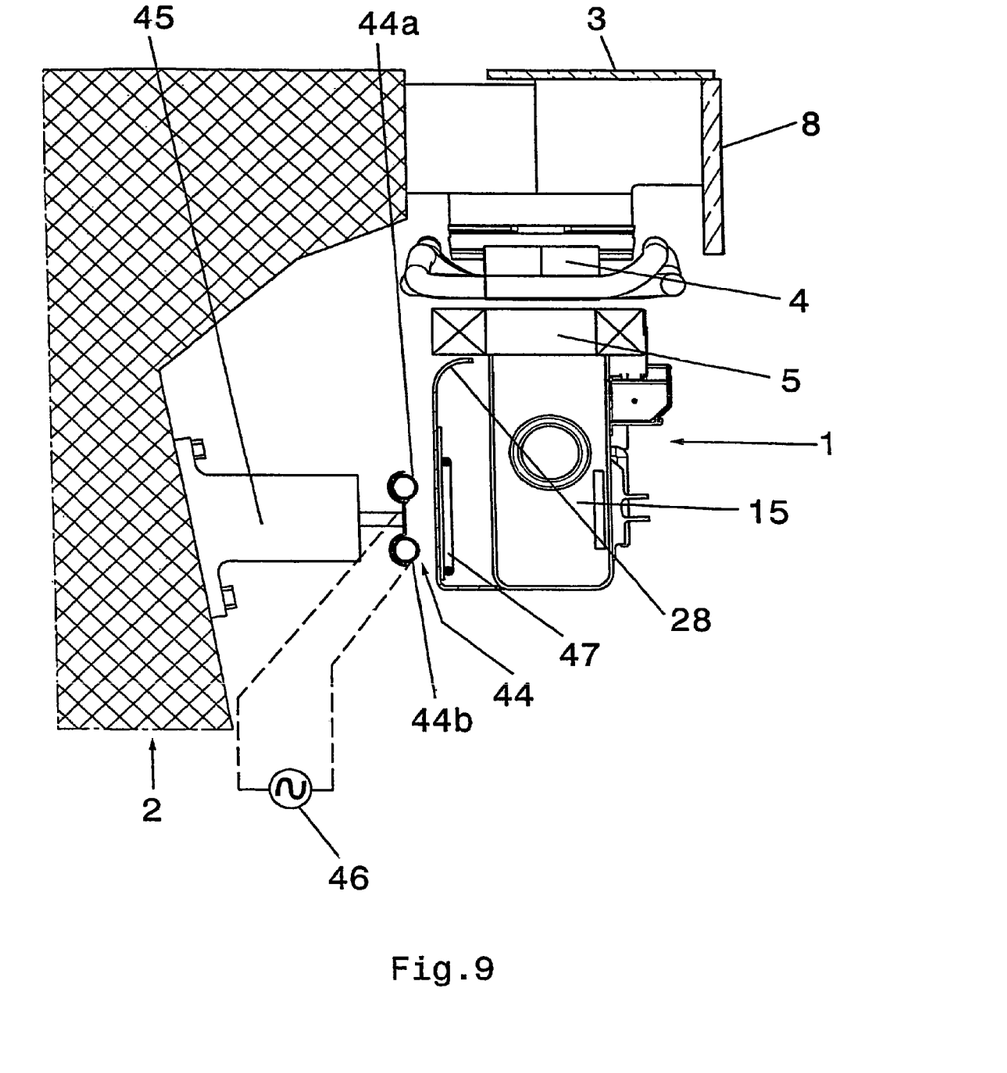
FIG. 9 shows a partial section similar to FIG. 1, but at a larger scale for illustrating a contact-less power transmission from the track to the magnetic levitation vehicle.

According to FIG. 9, at a point of the track where hitherto the current rail for the power collector 41 (FIG. 8) has been arranged, a primary conductor 44 configured as a transmitting coil is provided which preferably contains line sections 44a, 44b running to and fro and expediently extending over the entire length of the track 2, 3. The two line sections 44a, 44b are fastened to beam 2, e.g. by means of a holder 45 comprised of an isolator. The primary conductor 44 moreover is connected to at a preferably high-frequency voltage source 46 of 300 V, for example, which is only shown schematically. Instead of the current collector 41, a receiver or pick-up coil 47 is mounted at the magnetic levitation vehicle 1. It is preferably so configured that it does not surround the primary conductor 44, but stands opposite to it at a small distance. Thus it is possible to house the pick-up coil 47 like the other described components of the control circuits 18 and the power supply units inventively in the magnet back box 15 and to cover it with the covering 18 comprised of an electrically isolating material.

According to a particularly preferred embodiment, the holder 45 is of such a hinged configuration that the primary conductor 44 is hingedly mounted and can be swiveled to the top or to the bottom at beam 2 and can be swung-off section-wise. It can be avoided, therefore, that the primary conductor 44 must be fully dismounted during a work to which it poses an obstacle.

Figure 5:
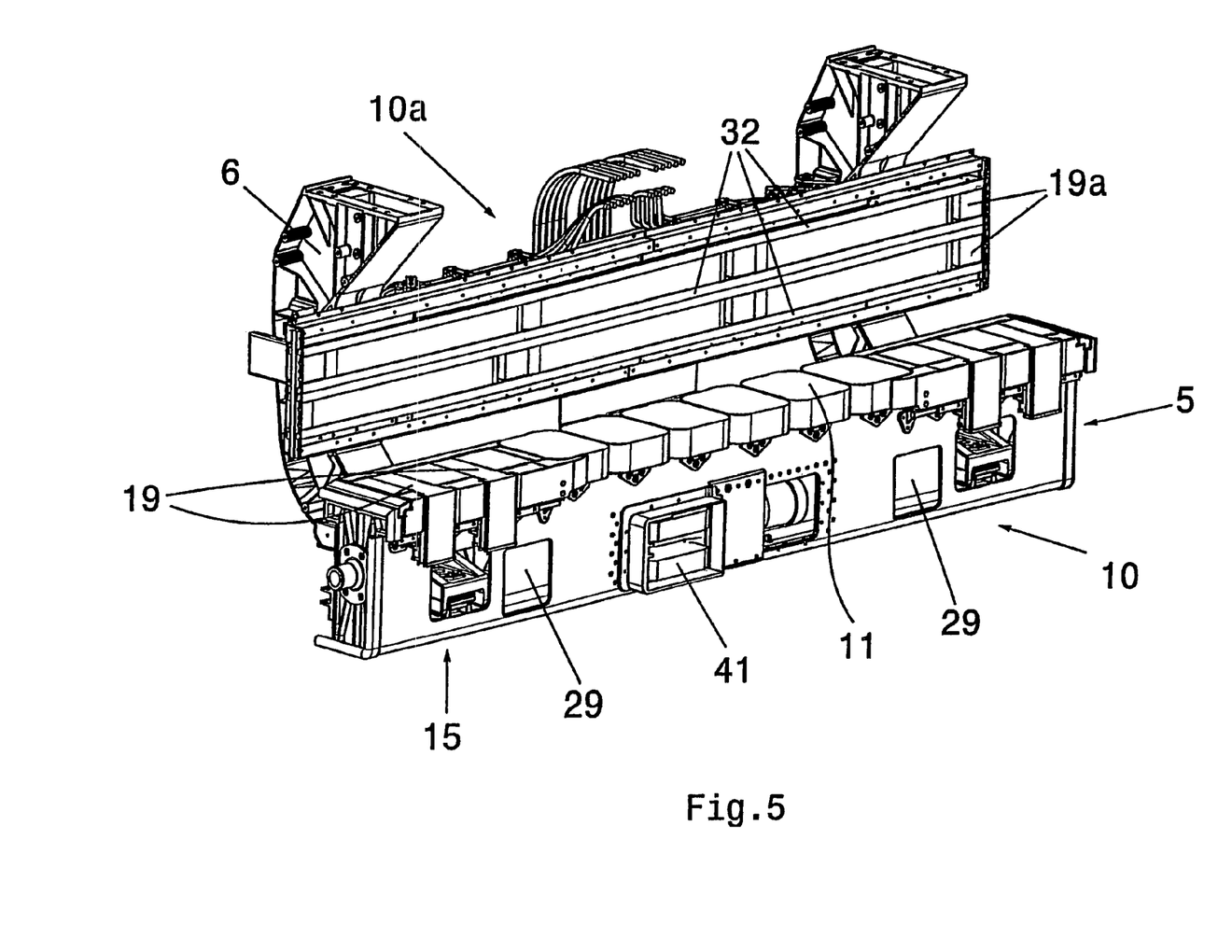
FIG. 5 shows a representation of the module corresponding to FIG. 3, but after removal of a front covering and with a view onto various components mounted in a magnet back box.

The configuration of the receiver coil 47 in shown in FIG. 10 to FIG. 13 in a representation similar to FIG. 5, and for reasons of redundancy the coil 47 expediently has two halves 47a and 47b that are assigned to one of the above described half-magnets A, B each and therefore have a length of approximately 1500 mm each in the embodiment. Each half 47a, 47b illustrated by a thick line in FIG. 10 and FIG. 12 preferably consists of a plurality of parallel conductors 47c (FIG. 13) that are relatively arranged to the primary conductor 44 so as to be penetrated by the concentric magnetic field lines generated by conductor 44 or line sections 44a, 44b respectively and so that the voltage of approximately 300V supplied by the primary conductor 44 can be coupled out at its connection ends not shown. The two connection ends therefore can be connected to the magnet pole units 36 or voltage converter 42 analogously to FIG. 8. It is obvious that expediently appropriate primary conductors 44 are laid at both sides of the beam 2, if the magnetic levitation vehicle is provided with magnet arrangements 10, 10a at both longitudinal sides.

The receiver coil 47 is preferably manufactured as a pre-fabricated modular group together with the necessary contact elements, e.g. plug connectors, and so mounted at and/or integrated into the magnet back box 15 or covering 28 that it forms part of the autonomous module formed by the magnet arrangement 10.

An essential advantage of a contact-less transmission of power is that it works with mechanically poor wear and that the energy coupled out is independent of the travel speed as in case of applying a contact rail. Moreover, a multiple redundancy is obtained, because there are two coil halves 47a, 47b per magnet arrangement 10. Furthermore, the windings 23 of the linear generator and, if properly rated, even the step-up choppers and on-board batteries can be dispensed with. An emergency power supply, if required, could then be assured by simple lead batteries arranged on the track side.

The receiver coil 47 or the winding halves 47a, 47b, respectively, are preferably configured in the manner of so-called layer windings. As shown on FIGS. 13, 14 and 15 for the winding half 47a, they contain a plurality of layers 48 lying in one plane. The individual layers 48 are preferably fabricated of a conductor with a round or square cross-section and they have mainly straight, first and second longitudinal sections 48a, 48b extending in parallel to each other and along the magnet arrangement 10 (FIG. 12) as well as winding heads 48c connecting their ends. The longitudinal sections 48a, 48b extend in parallel to the line sections 44a, 44b of the primary conductor 44 and serve for generating the voltage. The first longitudinal sections 48a are so assigned to the line section 44a and the second longitudinal sections 48b are so assigned to the line section 44b of the primary conductor 44 that the line sections 44a, 44b each are roughly arranged in the middle of the layer part formed by the assigned longitudinal sections 48a, 48b, as is particularly shown on FIG. 14. In contrast therewith, the conductors of the winding half 47a substantially extend in the area of the winding heads 48c vertically to the line sections 44a and 44b so that they do not contribute or at least only slightly contribute to the generation of voltage on the one hand and have a comparably large demand for space according to a size 1 in FIG. 14 in the longitudinal direction of the magnet arrangement 10 on the other hand. As for practical reasons the winding heads 48c moreover cannot protrude beyond the longitudinal ends of the magnet arrangements 10 (FIG. 12), they lead to the disadvantage that they reduce the effective length of the longitudinal sections 48a, 48b provided for generating the voltage and therefore impede the generation of an optimal voltage.

Figures 10, 11, 12, 13:
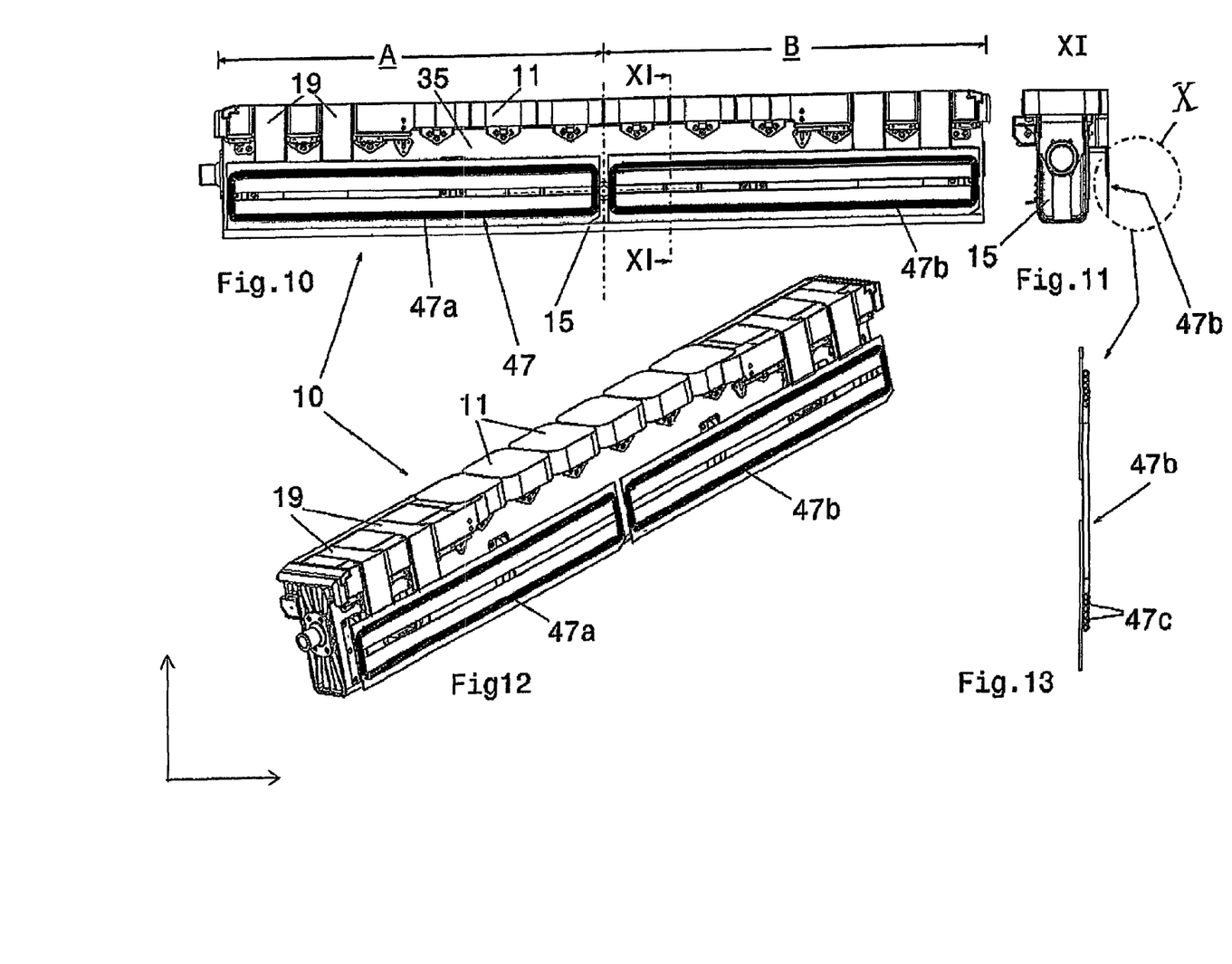
FIG. 10 shows the front view of a magnet arrangement with a pick-up coil for the contact-less power transmission, viewed from the side of a beam of the track.
FIG. 11 shows a section along line XI-XI of FIG. 10.
FIG. 12 shows a perspective front view of the magnet arrangement according to FIG. 10.
FIG. 13 shows a magnified detail X of FIG. 11.
Figure 16:
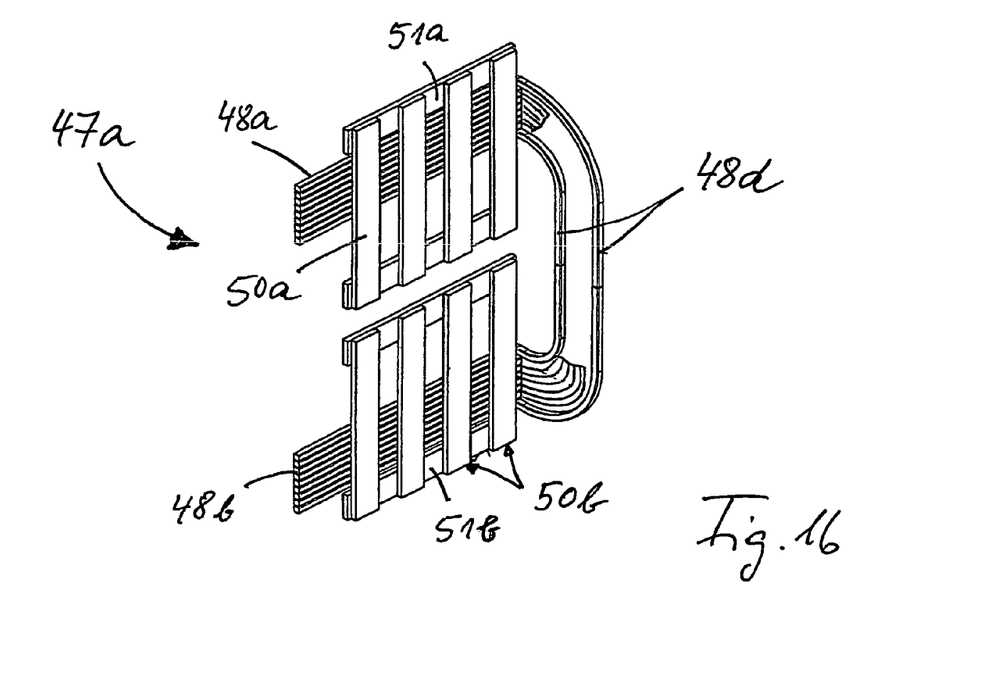
FIG. 16 schematically shows the part of the winding half visible in FIG. 15 after the winding heads have been bent at an angle of approximately 90°.

To avoid this drawback, this invention proposes to bend the pick-up coil 47 and/or its halves 47a, 47b at an angle in the area of the winding heads 48c from the winding plane formed by the longitudinal sections 48a, 48b backwardly. This is schematically shown in FIG. 16 for winding heads 48d bent at an angle of approximately 90° and in FIG. 17 and FIG. 18 for winding heads 48e bent at an angle of approximately 180°. As the pick-up coil 47 according to FIGS. 9 and 12 is mounted at the front end of the magnet back box 15 facing the primary conductor 44, the winding heads 48d thus come to rest vertically to the front end of the magnet back box 15, which is the reason why the latter is provided with corresponding recesses and/or slots that accommodate the bent winding heads 48d. With the winding heads 48e bent by an angle of 180°, these recesses can be configured accordingly less deep.

Figure 17:
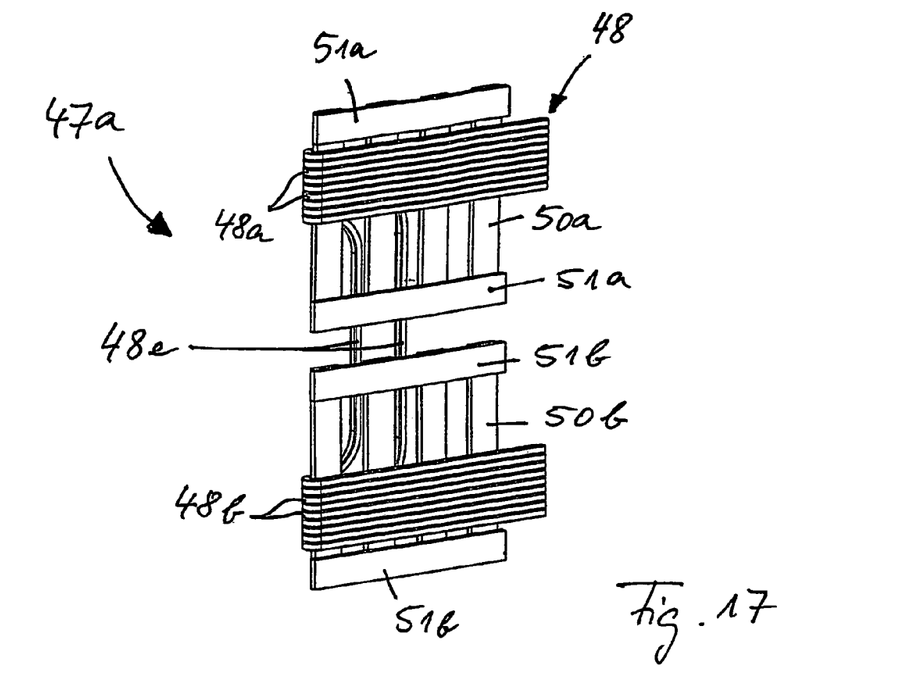
FIGS. 17 and 18 schematically show the winding half in the views corresponding to FIG. 14 and FIG. 15, but after the winding heads have been bent at an angle of approximately 180°.
Figure 18:
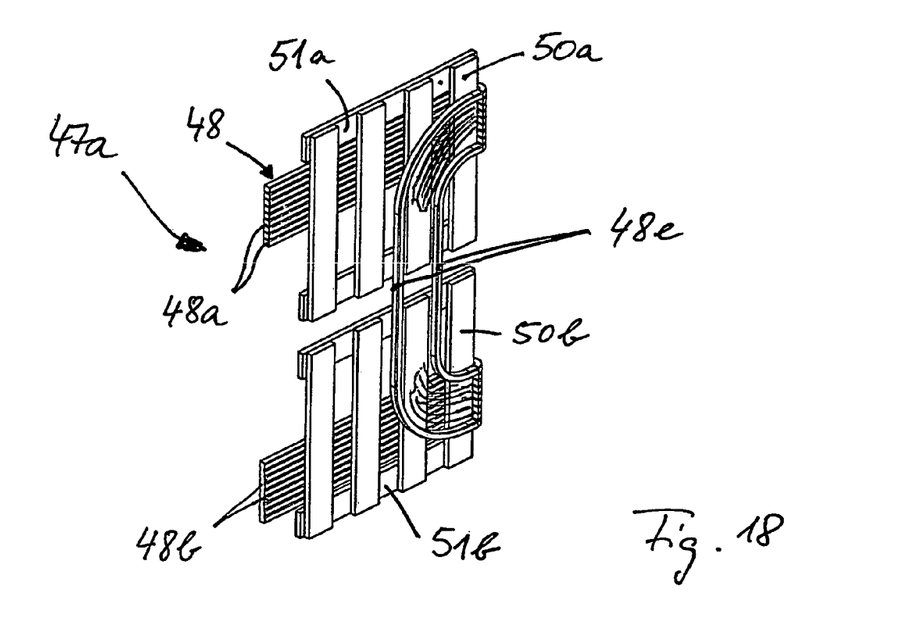

As all the individual layers 48 of the receiver coil 47 and/or their halves 47a, 47b lie in parallel to the winding plane one above the other, each individual layer 48 can be bent at the same position without causing adjacent layers 48 to obstruct this procedure. As a result, a comparably sharp buckling point for the entire winding with the consequence that the longitudinal sections 48a, 48b of the pick-up coil 47 and/or the winding halves 47a, 47b can practically be extended over the full length of the magnet arrangement 10 and thus be configured by a measure 2·1 longer than the size shown on FIG. 14. It is self-explanatory that the 90° and/or 180° bends shown in FIG. 16 to 18 represent particularly preferred embodiments, but that also bends having other angles, particularly angles between 90° and 180° are also possible. Moreover, the winding heads 48c may also be bent toward the opposite side, depending on the arrangement and configuration of the magnet arrangement 10. Finally, the invention makes it possible to compose the pick-up coil 47 from more than two parts 47a, 47b, without this reducing the total length of the involved longitudinal sections 48a, 48b substantially. If there is a plurality of magnet arrangements 10 and/or pick-up coils 47 along the magnetic levitation vehicle, the effective length of the line sections 48a, 48b is thereby substantially enhanced.

The arrangement shown on FIG. 14 to FIG. 18 leads to a comparably small magnetic coupling between the primary conductor 44 and the pick-up coil 47 or line sections 44a, 44b and the longitudinal sections 48a and 48b, respectively. Moreover, it bears the risk of eddy current losses in components of the magnet back box 15 (FIG. 9) which consist of metal and which are arranged behind the pick-up coil 47. Therefore it has already been proposed to provide on a side of the pick-up coil 47 opposite of the primary conductor 44 a means for concentrating the magnetic field lines 49a, 49b generated by the primary conductor 44 and schematically indicated in FIG. 19. This means particularly contains components which consist of a material with a high permeability and a high electrical resistance. A particularly preferred material for this purpose is ferrite, especially soft ferrite, which however is comparably brittle, mechanically sensitive and therefore poorly workable because it is made of ferromagnetic powders and produced by pressing and subsequent sintering. With the arrangement already proposed, the means for concentrating the field lines is therefore not composed of large-area, plate-like elements, but of a plurality of comparably small material strips and connecting elements which are connected to each other by gluing or the like to form grid frames and which have sufficient mechanical stability for the purpose of the present invention. In case that the pick-up coil 47 is comprised of at least two halves 47a, 47b and that each half with its longitudinal section 48a, 48b stands opposite to one of the two line sections 44a, 44b (FIG. 9 and FIG. 12), then the same arrangement is provided for each half 47a, 47b. If a one-piece pick-up coil 47 is provided, then the same applies to it in this sense. Therefore, only the arrangement provided for one winding half 47a is explained in greater detail hereunder.

Figure 19:
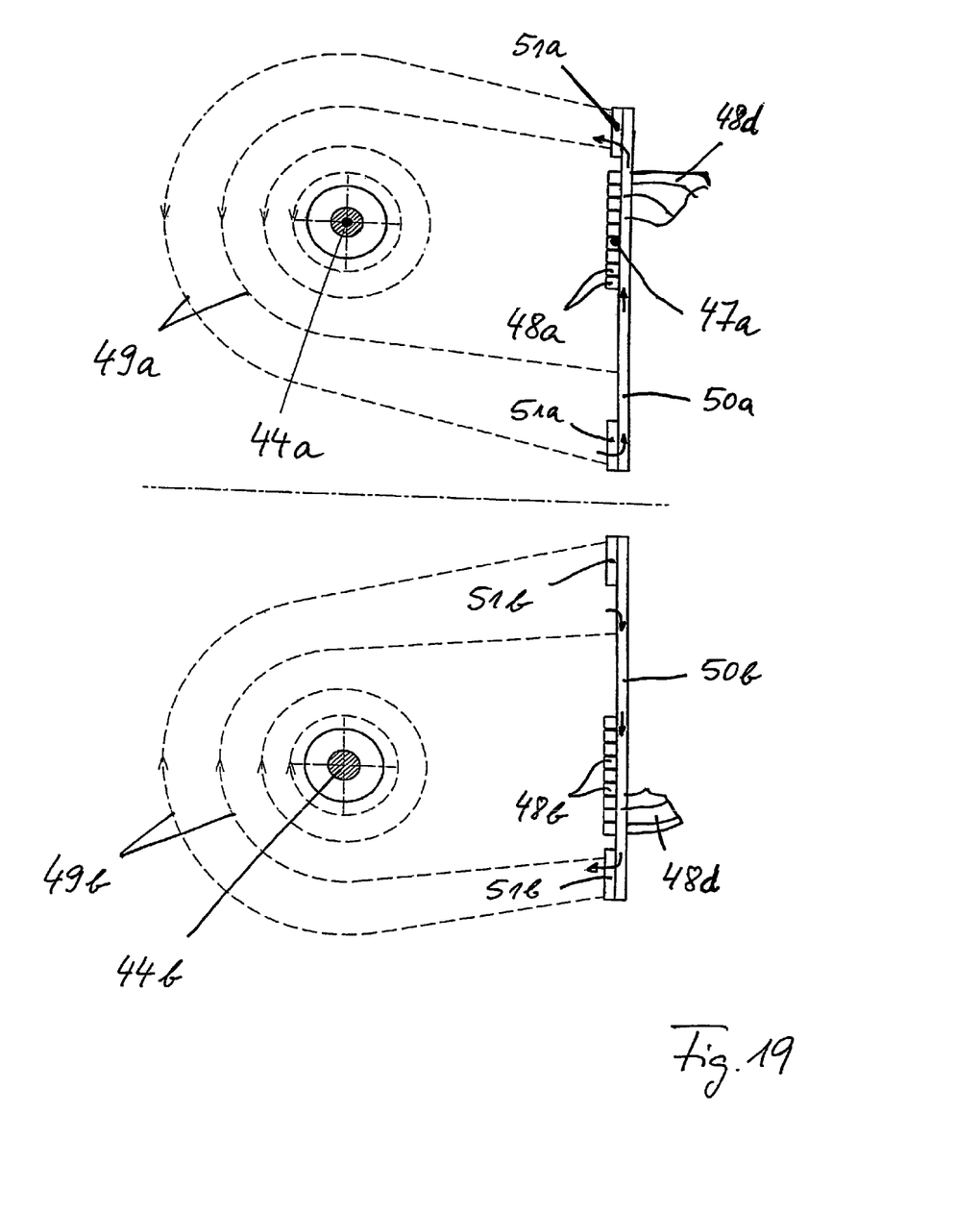
FIG. 19 schematically shows an enlarged cross-section through a winding half according to FIG. 16 and the primary conductor.

With an embodiment of the invention which also becomes evident from FIG. 14 to FIG. 18 and which is additionally shown on FIG. 19, and which is currently considered the best, a plurality of first material strips 50a is provided on a side of the winding half 47a opposed to the line section 44a, said material strips substantially being arranged vertically to the line section 44a and in parallel to the winding plane formed by the longitudinal sections 48a. At a side of the winding half 47a facing away from the line section 44b, with a corresponding arrangement, a plurality of second material strips 50b is provided which are expediently arranged in the same plane as the first material strips 50a. Both material strips 50a, 50b have a length which is a little longer than the measure that corresponds to the height of the layer parts formed by the longitudinal sections 48a, 48b, without overlap of their ends facing each other. The individual material strips 50a, 50b each are arranged like a grid and with pre-selected distances in parallel to each other.

The ends of the first material strips 50a are connected by first connecting elements 51a which are substantially arranged in parallel to the line section 44a. Accordingly, the ends of the second material strips 50b are connected by second connecting elements 51b. Modular elements configured like grid frames are thus created which are fastened to the magnet back box 15 in a manner not shown here in any greater detail.

Both the material strips 50a, 50b and the connecting elements 51a and 51b which for example have been connected to each other by gluing are preferably made of a ferrite. Moreover, they are expediently arranged closely behind the longitudinal sections 48a, 48b and in such a manner that they cause a concentration of the field lines 49a and/or 49b generated by the line sections 44a, 44b, as is schematically indicated on FIG. 19. With respect to FIG. 19 it is assumed that electric current flows through the line section 44a presently in a direction emerging from the drawing plane and through the line section 44b presently in a direction entering into the drawing plane. On account of the high permeability of the material strips 50a, 50b, the field lines 49a, 49b are closed immediately behind the line sections 48a, 48b, as is schematically indicated by arrows on FIG. 19, thus substantially increasing the magnetic coupling which is favourable for the generation of the voltage. At the same time, due to the high electrical resistance of the material strips 50a, 50b it is avoided that major eddy current losses occur, all the more because the material strips 50a, 50b and connecting elements 51a, 51b magnetically shield those parts of the magnet back box 15 lying behind them. Finally, the connecting elements 51a, 51b cause a largely uniform distribution of the magnetic flux within the grid frame structure. The length of the material strips 50a, 50b and of the connecting elements 51a, 51b is properly chosen to collect and/or concentrate as many field lines 49a, 49b as possible.

Figure 14:
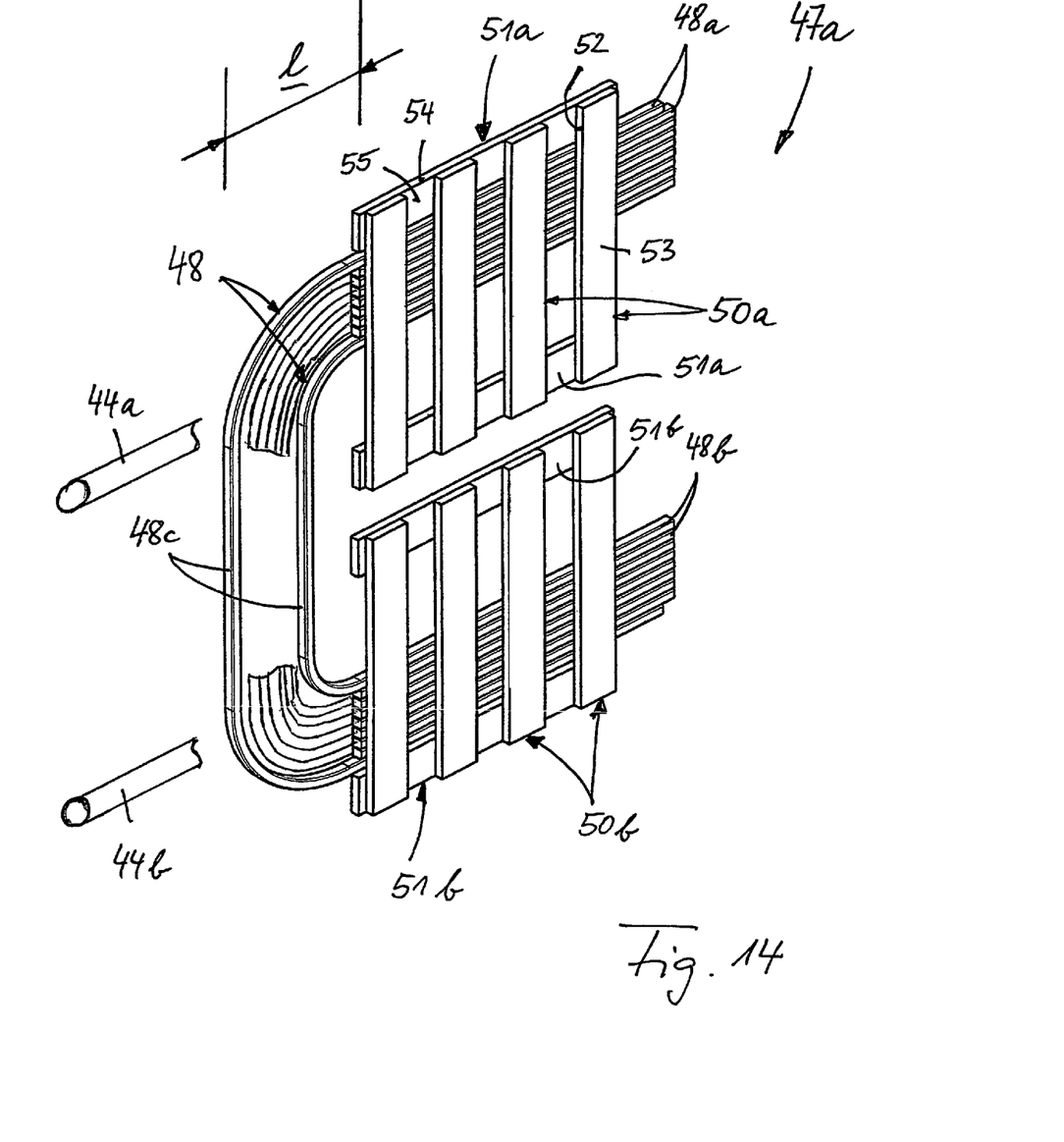
FIG. 14 shows a schematic and perspective, substantially enlarged view of part of a winding half of a pick-up coil integrated into the magnet arrangement according to FIG. 12, viewed from the front, i.e. viewed from the side of a primary conductor mounted on the track beam and shown in FIG. 9.
Figure 15:
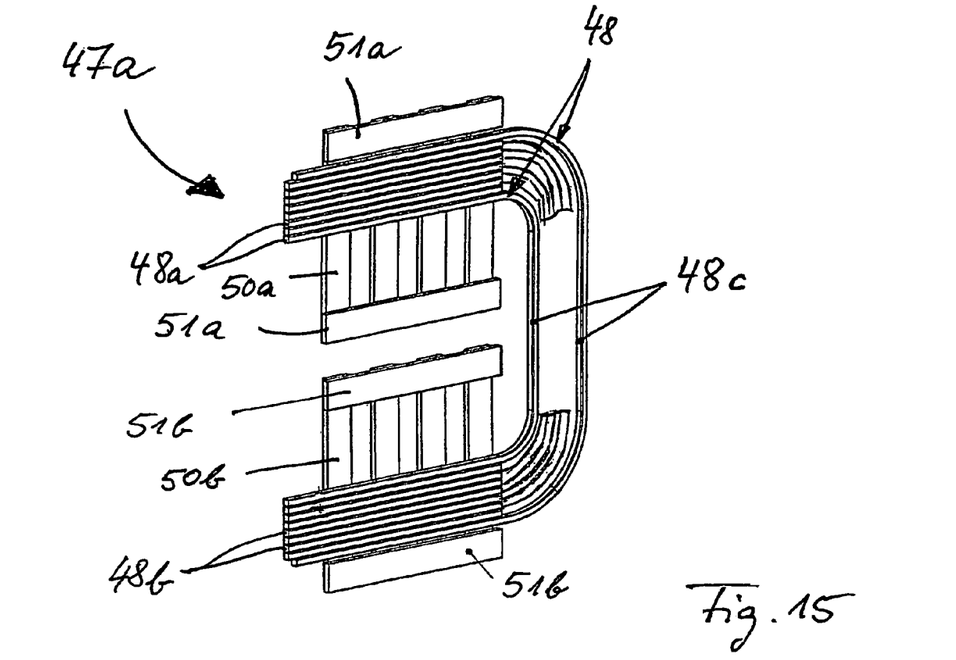
FIG. 15 shows a representation of the winding half corresponding to FIG. 14, but viewed from the back, i.e. viewed from the side of a magnet back box mounted on a magnetic levitation vehicle.

Both the material strips 50a, 50b and the connecting elements 51a, 51b preferably have rectangular cross-sections and thus small and broad sides 52, 53 and 54, 55, respectively, which are schematically indicated on FIG. 14. The broad sides 53, 55 are preferably arranged in parallel to the winding plane. Moreover, the broad sides 55 of the connecting elements 51a, 51b abut according to the present invention against the broad sides 53 of the material strips 50a, 50b, whereby comparably large connection and/or joint areas as well as comparably small magnetic transition resistances are obtained, despite the unavoidable air gaps, which leads to a further improvement of the magnetic circuits. When fixing the connecting elements 51a, 51b on the sides of material strips 50a, 50b which face the line sections 44a, 44b, it moreover gives the advantage that the connecting elements 51a, 51b mainly come to rest in the same plane as the longitudinal sections 48a, 48b of the winding half 47a, as is particularly shown on FIG. 19. Thereby, they do not demand additional space, particularly if their thickness is not greater than the thickness of the longitudinal sections 48a, 48b, which is sufficient in magnetic terms.

The material strips 50a, 50b and connecting elements 51a, 51b, for example, are made of ferrite rods having a length of maximally 100 mm, a width of maximally 15 mm and a thickness of maximally 3 mm. With a distance of approximately 150 mm between the line sections 44a, 44b, and a height of approximately 30 mm each of the layer parts formed by the longitudinal sections 48a, 48b, if e.g. ten layers are provided, the length of the material strips 50a, 50b may amount for example to 100 mm, and their mutual distance in parallel to the primary conductor 44 may amount for example to 15 mm. The distance of the pick-up coil 47 from the primary conductor 44 in this case amounts to e.g. 40 mm. Moreover, it is obvious that in the longitudinal direction of the longitudinal sections 48a, 48b several grid frames formed from the material strips 50 and from the connecting elements 51 can be arranged one behind the other, if the winding halves 47a, 47b are substantially longer than the lengths of the connecting elements 51 that can be processed without any problem.

The invention is not limited to the embodiments described hereinabove that can be modified in a plurality of ways. In particular, this applies to the total number of magnet arrangements 10, 10a existing per magnetic levitation vehicle and to the setup of modules from magnet arrangements 10, 10a for the design of support magnets, guidance magnets or combinations of support and guidance magnets. Furthermore, the number of magnet poles 11, 32 per support and guidance magnet can be chosen in a manner different from the one described. Finally, it is self-explanatory that the different features can also be applied in combinations other than those described and shown hereinabove.

The invention claimed is:

1. A system for transmitting electrical energy in a magnetic levitation railway system, comprising:
   a track (2, 3);
   a vehicle (1) having a car body (17), a suspension frame (16) supporting the car body (17), a magnet back box (15) connected via spring means to at least one support bracket (6), said at least one bracket (6) connected to said suspension frame (16), at least one support magnet arrangement (10) connected to the magnet back box (15) and cooperating with said track (2, 3) for supporting said vehicle (1) in a levitated condition, at least one pick-up coil (47) adapted as a receiving coil that is also mounted to said magnetic back box (15), the pick-up coil (47), the support magnet arrangement (10) and the magnet back box (15) operating as an integral modular unit, wherein the track (2, 3) includes at least one primary conductor (44) adapted as an emitting coil for transmitting electrical energy to said vehicle (1); and a voltage source (46) connected to the at least one primary conductor (44), wherein said at least one primary conductor (44) is associated with said at least one pick-up coil (47), wherein the pick-up coil (47) is embodied as a pre-fabricated modular group provided with the required contacting elements and that the magnet back box (15) comprises contact means for cooperation with the contacting elements as well as plug-in and/or draw-out means for accommodation of the modular group.

2. The system according to claim 1, wherein the pick-up coil (47) is mounted on or within a covering (28) of the magnet back box (15).

3. The system according to claim 1, wherein the pick-up coil (47) is at least comprised of two winding halves (47a, 47b) which are assigned each to one half of the magnet arrangement (10).

4. The system according to claim 1, wherein the pick-up coil (47) is part of a power supply unit also accommodated in the magnet back box (15).

5. The system according to claim 4, wherein the power supply unit has a voltage converter (24) arranged between the pick-up coil (47) and the magnet arrangement (10).

6. A system for transmitting electrical energy in a magnetic levitation railway system, comprising:
   a track (2, 3);
   a vehicle (1) having a car body (17), a suspension frame (16) supporting the car body (17), a magnet back box (15) connected via spring means to at least one support bracket (6), said at least one bracket (6) connected to said suspension frame (16), at least one support magnet arrangement (10) connected to the magnet back box (15) and cooperating with said track (2, 3) for supporting said vehicle (1) in a levitated condition, at least one pick-up coil (47) adapted as a receiving coil that is also mounted to said magnetic back box (15), the pick-up coil (47), the support magnet arrangement (10) and the magnet back box (15) operating as an integral modular unit, wherein the track (2, 3) includes at least one primary conductor (44) adapted as an emitting coil for transmitting electrical energy to said vehicle (1); and
   a voltage source (46) connected to the at least one primary conductor (44), wherein said at least one primary conductor (44) is associated with said at least one pick-up coil (47),
   wherein the pick-up coil (47) and/or each winding half (47a, 47b) is designed as a layer winding arranged in a winding plane, said layer winding comprising longitudinal sections (48a, 48b) extending in parallel to the primary conductor (44) and winding heads (48d, 48e) connecting the longitudinal sections (48a, 48b) with each other.

7. The system according to claim 6, wherein the winding heads (48d, 48e) are bent at an angle out of the winding plane.

8. The system according to claim 7, wherein the winding heads (48d, 48e) are bent at an angle of approximately 90° to 180°.

9. The system according to claim 6, wherein the longitudinal sections (48a, 48b) and the winding heads (48d, 48e) are comprised of conductors with round or square cross-sections.

10. A system for transmitting electrical energy in a magnetic levitation railway system, comprising:
    a track (2, 3);
    a vehicle (1) having a car body (17), a suspension frame (16) supporting the car body (17), a magnet back box (15) connected via spring means to at least one support bracket (6), said at least one bracket (6) connected to said suspension frame (16), at least one support magnet arrangement (10) connected to the magnet back box (15) and cooperating with said track (2, 3) for supporting said vehicle (1) in a levitated condition, at least one pick-up coil (47) adapted as a receiving coil that is also mounted to said magnetic back box (15), the pick-up coil (47), the support magnet arrangement (10) and the magnet back box (15) operating as an integral modular unit, wherein the track (2, 3) includes at least one primary conductor (44) adapted as an emitting coil for transmitting electrical energy to said vehicle (1); and
    a voltage source (46) connected to the at least one primary conductor (44), wherein said at least one primary conductor (44) is associated with said at least one pick-up coil (47),
    wherein a plurality of materials strips (50a, 50b) is provided on a side of the receiving coil (47) away from the primary conductor (44), said material strips arranged substantially vertically to the primary conductor (44), in parallel to a winding plane and serving for concentrating the field lines (49a, 49b) which are generated by the primary conductor (44), wherein said material strips (50a, 50b) are connected at their ends by connecting elements (51a, 51b), which are arranged in parallel to the primary conductor (44), substantially in a winding plane, and resting on the ends of the material strips (50a, 50b), and wherein said material strips (50a, 50b) are made of materials having a high permeability.

11. The system according to claim 10, wherein the material strips (50a, 50b) and the connecting elements (51a, 51b) have rectangular cross-sections and thus small and broad sides (52, 54 and/or 53, 55), wherein the broad sides (53, 55) are arranged in parallel to the winding plane, and that the connecting elements (51a, 51b) with their broad sides (55) rest on the broad sides (53) of the materials strips (50a, 50b).

12. The system according to claim 10, wherein the primary conductor (44) is comprised of two line sections (44a, 44b) which serve for being passed through by electric current in opposite direction and to which one part each of the longitudinal sections (48a, 48b) of the pick-up coil (47) or its halves (47a, 47b) is assigned, and that each of these parts is arranged in a middle area of assigned material strips (50a, 50b).

13. The system according to claim 10, wherein the material strips (50a, 50b) and the connecting elements (51a, 51b) are made of a ferrite.

* * * * *